United States Patent [19]
Mitchell

[11] 3,973,052
[45] *Aug. 3, 1976

[54] POTASSIUM ISOHUMULATE HOP EXTRACTS

[75] Inventor: William Mitchell, Hatfield, England

[73] Assignee: Bush Boake Allen Limited, London, England

[ * ] Notice: The portion of the term of this patent subsequent to Apr. 6, 1993, has been disclaimed.

[22] Filed: Jan. 8, 1975

[21] Appl. No.: 539,440

Related U.S. Application Data

[60] Continuation of Ser. No. 355,160, April 27, 1973, abandoned, which is a continuation of Ser. No. 129,587, March 30, 1971, abandoned, which is a division of Ser. No. 629,905, April 11, 1967, Pat. No. 3,607,298, which is a continuation-in-part of Ser. No. 359,788, April 14, 1964, abandoned.

[30] Foreign Application Priority Data

Sept. 16, 1963 United Kingdom............... 36382/63

[52] U.S. Cl.................................. 426/592; 426/600
[51] Int. Cl.² .......................................... C12C 9/02
[58] Field of Search............... 426/11, 16, 349, 221, 426/600, 592; 260/586

[56] References Cited
UNITED STATES PATENTS

| | | | |
|---|---|---|---|
| 3,044,879 | 7/1962 | Koeh et al. ..................... | 426/349 X |
| 3,298,835 | 1/1967 | Hildebrand et al. ............ | 426/349 X |
| 3,354,219 | 1/1967 | Rigby............................. | 426/349 X |
| 3,364,265 | 1/1968 | Klingel et al..................... | 426/11 X |

FOREIGN PATENTS OR APPLICATIONS

| | | | |
|---|---|---|---|
| 619,563 | 5/1961 | Canada.............................. | 426/349 |
| 855,401 | 11/1960 | United Kingdom................. | 426/349 |

*Primary Examiner*—Joseph M. Golian
*Attorney, Agent, or Firm*—Herbert H. Goodman

[57] ABSTRACT

The present invention provides stable aqueous hop extracts suitable for bittering beer which contain substantially no fixed hop seed oil. The hop extracts consists essentially of potassium isohumulate and between 16% and 72% by weight of water.

9 Claims, No Drawings

POTASSIUM ISOHUMULATE HOP EXTRACTS

This is a continuation of Ser. No. 355,160 (now abandoned) filed on Apr. 27, 1973 which is a continuation of Ser. No. 129,587 (now abandoned) filed on Mar. 30, 1971 which was a divisional application of Ser. No. 629,905 (now U.S. Pat. No. 3,607,298) filed Apr. 11, 1967 which in turn was a continuation-in-part application of Ser. No. 359,788 (now abandoned) filed on Apr. 14, 1964.

The present invention relates to hop extracts, including isomerised hop extracts and to processes for their production.

Hops contain, among other things: soft and hard resins, including such weakly acidic compounds as humulones (e.g. humulone, cohumulone and adhumulone) and lupulones; essential oils which are those relatively volatile oils which contribute to the characteristic odour of hops; fixed oils, which are contained in the hop seeds and are not readily distilled or extracted by hot water; and water soluble material such as tanins and proteins.

In the traditional brewing process hops are boiled with wort, which is an aqueous solution of malt sugars. As a consequence of the boiling, a variety of resins and oils pass into the wort. Of these the most important are the humulones, which on boiling are partially isomerised to form water soluble isohumulones. It is believed that the isohumulones are the principle bittering agent present in the finished beer, but a very large number of other compounds of widely differing chemical nature are also present in traditional beer and contribute to its properties. In the traditional process only a small proportion of the humulones present in the hops are isomerised and taken into solution. Further disadvantages of the traditional method are the need to store a large bulk of hops, which are liable to deteriorate, and the variability of flavour between batches.

The extraction of hops by solvents to give hop extracts which can be used to replace or augment hops in the brewing of beers and ales has received considerable attention for many years. This problem has attracted increased attention during the last ten years because of the development in the chemistry of hop constituents and because the brewing industry has become rather less conservative in its attitude toward changes in materials and methods.

There are five main attractions to the successful use of solvent extracts of hops. Those can be summed up as follows:

1. Hops vary widely in their content of humulones which are now considered to be the principal substance of brewing interest in the hop. Variation due to the sampling and to age of the hop and to varietal factors effect the humulone content whereas an extract can be made virtually homogeneous, thus removing sampling error. It thus enables the brewer to specify with certainty the amount of humulones he is going to use in brewing.

2. The use of a solvent extract of hops results in a considerable saving in storage space since the extract occupies very little space as compared with the amount of actual hops which would be required to furnish the same quantity of active constituents. In addition it is necessary to store hops at a reduced temperature in order to minimise their deterioration; and in any case hops only have a limited storage life, whereas a hop extract is staole.

3. When using a solvent extract of hops there is an improved utilisation of the humulones contained in the extract as compared with humulones contained in hops themselves. The conversion of humulones into isohumulones in the production of beer from actual hops is rarely higher than 30% whereas higher conversions can be obtained using a solvent extract of hops.

4. Solvent extracts of hops can be stored for long periods, thus insulating the brewer from the large price fluctuations and supply difficulties which occur due to the varying yields of hops from year to year.

5. The disposal of "spent hops" is a continuing problem in the brewing industry and the use of a solvent extract of hops overcomes this difficulty, at least so far as the brewer is concerned.

It has therefore been proposed to increase the utilisation of humulones by contacting the hops with an organic extracting solvent, thereby extracting as much as possible of the humulones and other resins and oils. It has been found that extracts prepared in this way have a disagreeable flavour which makes beer unpalatable, especially when the latter is pasteurised in the bottle. Furthermore, when such extracts are added to wort and boiled, only a small proportion of the humulones are converted into isohumulones. To overcome the latter drawback it has also been proposed to isomerise humulones by boiling with alkali. This effectively isomerises the humulones but causes deterioration of some other ingredients commonly present in the hops or hop extract.

Processes have been proposed whereby the extract may be separated into its various components, enabling the humulones to be obtained free of other hop ingredients and isomerised separately, but the pure isohumulones have a harsh flavour, and none of the other hop components provides a natural beer flavour on its own. Moreover the cost of effecting such separations outweighs the economic advantage of increased utilisation of the hop ingredients.

It is an object of the present invention to provide an improved utilisation of the humulone content of hops without, at the same time, giving the beer undesirable flavour characteristic, for example when pasteurised. A further object of the invention is to provide an extract which can be used to prepare beer whose flavour corresponds closely to that prepared by the traditional process. A still further object of the present invention is to provide isomerised extracts which do not possess the off flavours normally produced when hops are contacted with boiling alkali.

We have discovered that, under the rigorous extracting conditions necessary to separate the majority of the humulones and other desirable ingredients from the matrix of insoluble cellulosic material, certain undesirable materials are extracted as well. The latter include a part of the fixed oils of the hop seeds. We have further discovered that such crude solvent extracts may be purified by contacting with a solvent which dissolves the humulones and other desirable materials, but in which the fixed oils are relatively insoluble. In particular, we have discovered that 80–95% aqueous lower alcohol, such as methanol or ethanol, may be used to purify crude hop extracts to give a more natural flavour.

We have also discovered that purified hop extracts may be conveniently isomerised with hot aqueous alkali without developing an unpleasant flavour, providing the essential hop oils are first removed. We have found that this can be achieved by contacting a solution of the extract in a water-immiscible solvent with an aqueous alkali, whereupon the humulones, together with certain other desirable acidic ingredients, pass into the aqueous phase while the essential oils remain in the organic phase.

If, on the other hand, isomerisation of the humulones with hot alkali is performed prior to the separation of the fixed oils, we have found that the isomerised crude extract can be freed from substances producing off flavours by contacting it with 80–85% aqueous methanol at a pH between 2 and 7.

Our invention, therefore, provides inter alia a solvent extract of hops containing humulones together with other hop ingredients which are soluble in organic extracting solvents, but which is substantially free of fixed hop seed oil.

Our invention further provides, in the process for preparing a solvent extract of hops wherein hops are contacted with an extracting solvent to form a solution of a crude extract and the solution is separated from insoluble matter, the improvement which comprises: contacting the said crude extract with a purifying solvent which dissolves the humulones but not the fixed oils to form a solution of a purified extract; separating the undissolved fixed oils from the solution; and recovering the purified extract.

According to a preferred embodiment our invention provides a method of purifying a crude solvent extract of hops which comprises; contacting the said crude extract with an organic solvent consisting essentially of from 0–95% by volum of methanol, from 0–95% by volume ethanol and from 5–20% of water in an amount sufficient to disolve a part of the crude extract, thereby forming a solution of the purified extract; separating the solution of the purified extract from the undisolved part of the crude extract; and recovering the purified extract.

The invention also provides a method of isomerising hop extracts which comprises separating the essential oils from the acidic components of the extract and boiling the latter with aqueous alkali.

Our invention further provides a method of isomerising a solvent extract of hops which comprises contacting a solution of the extract in a water immiscible solvent with aqueous alkali, separating the aqueous phase from the non-aqueous phase, boiling the aqueous phase and recovering th isomerised extract.

A further aspect of our invention provides a method of purifying an isomerised crude extract of hops which comprises: contacting the said isomerised rude extract with sufficient acid to bring the pH of the extract to a value of from 2 – 7 and with sufficient of a solvent consisting of 80–85% methanol and 15–20% water to disolve a part of the extract; separating the solution from the undisolved matter and recovering the disolved portion of the extract.

Crude extracts for use in our invention may be conveniently prepared by methods known to the art. Preferably the hops are contacted with an excess of an organic solvent. The preferred solvents for use in preparing the crude extract are hydrocarbons such as light petroleum and especially benzene. Other solvents which may be used include acetone, absolute methanol and carbon tetrachloride. The hops may conveniently be ground, for example in a high speed hammermill and slurried with excess of the solvent, preferably at ambient temperature, and the insoluble material is then removed by centrifuging or filtration. Alternatively the solvent may be percolated through the ground hops. The solvent may then be evaporated off to leave the crude extract.

The solvent which we prefer to use, according to our invention, for the purification of the crude extract is aqueous methanol containing from 80 to 90% methanol and 10 to 20% water.

The crude extract may be recovered and then contacted, preferably at room temperature, with sufficient aqueous alcohol to dissolve the more readily soluble portion. The insoluble or sparingly soluble portion is then separated, for example by centrifuging, and washed with a small portion of aqueous alcohol, which is added to the main bulk of the solution. The solvent is then evaporated. Alternatively the crude extract may be dissolved in just sufficient absolute alcohol to dissolve the extract, and the solution diluted with 5 to 20% water. For example the hops may be initially extracted with absolute methanol, and solution of crude extract concentrated to saturation and 5 to 20% by volume of water added.

Using the former method to purify benzene extracts of good quality hops, we have obtained extracts containing from 82 to 94% of soft resins, including a total humulones content of from 25 to 55%, a total lupulones content of from 10 to 40%, from 1 to 4% of essential oil of hops, up to 2% of water and the balance of other resinous material soluble in aqueous methanol.

It has further been found that the purified extracts of hops produced as described above, although they can be successfully used in brewing are greatly improved if they are converted, prior to packing, into a dispersible form. This can be done by blending the warm extract with a commercially available emulsifying agent and an emulsion stabilising agent together with brewing sugars. The material produced is viscous but when warmed and mixed with a moderate volume of hot water yields a cream which is relatively stable and which when added to boiling wort provides intimate contact between the hop resins and the boiling wort. In this way a more efficient utilisation of the humulones is obtained. A suitable emulsifying agent is methyl ethyl cellulose, a suitable stabilising agent is sodium carboxymethyl cellulose and glucose syrup can be used as the brewing sugar.

It has been found that a suitable dispersion can be obtained by adding to 100 parts by weight of the purified hop extract a mixture of 2.5 parts by weight of 5% aqueous methyl ethyl cellulose solution, 2.5 parts by weight of a 5% aqueous sodium carboxymethyl cellulose solution and 2.5 parts by weight of glucose syrup (70% glucose w/v in water). However, it is possible to add as much as 50 parts by weight of the 5% aqueous solutions of the emulsifying agent and the stabilising agent for each 100 parts by weight of hop extract and there is no upper limit to the quantity of brewing sugar which may be added.

The preferred water-immiscible solvents for use in the preparation of an isomerised extract according to the invention are hydrocarbons and chlorinated hydrocarbons for example benzene, light petroleum and carbon tetrachloride. The concentrate may be dissolved in the water immiscible solvent, and the solution is preferably separated from any insoluble matter by filtration or centrifuging. The solution is then contacted with aqueous alkali, employing vigorous agitation. The phases are separated, the aqueous phase being filtered or centrifuged, and then heated to distil off any residual organic solvent, and to isomerise the humulones.

The preferred alkali for use in the isomerisation process is potassium hydroxide but sodium hydroxide can also be used. The concentration of the alkali used is not critical but a preferred concentration is from 2 to 20% w/v; a concentration of 10% w/v has been found to be advantageous.

It is preferred to use just sufficient of the alkali to bring the pH of the solution at the alkaline extraction stage to within the range of 10.7 to 12.0, advantageously 10.7 to 11.0.

In a modification of the isomerisation process, sodium or potassium hydroxide is used as the alkali but carbon dioxide gas is passed through to alkaline solution during the distillation which converts the sodium or potassium hydroxide to the corresponding carbonate and maintains an inert atmosphere during isomerisation.

Preferred conditions for distillation and isomerisation are the use of atmospheric pressure and distillation times of at least one hour.

The organic solvent solution which is separated out may contain hop seed oil, essential oil of hops and other materials which may have been present in the concentrate and the organic solvent solution can be worked up to recover them.

The alkaline solution containing the isohumulones can be added to an unhopped or lightly hopped beer to bring the isohumulones up to the desired level and to obtain the requisite bitterness. Alternatively it may be further concentrated by distillation under reduced pressure to obtain a viscous extract. If preferred, the drying can be continued to give a dry solid residue which can be powdered and is greenish yellow to golden in colour. This dry powder is hygroscopic, and should be stored in sealed containers.

The alkaline solution of isohumulones, or concentrates obtained from it (dispersed in water to give solutions which may be turbid) can readily be dispersed into beer. The conversion into isohumulones based on the humulone content of the original concentrate may reach a figure of 80% or better.

The above described isomerisation may be performed after crude extract has been purified to remove fixed oils in accordance with our invention. Where the isomerisation is carried out directly on a crude extract it is desirable to separate any fixed oil from the isomerised crude extract. In this instance it is desirable to contact the hops with a water immiscible organic extracting solvent to form a solution of crude extract, separate the solution from insoluble matter, contact the solution with aqueous alkali, separate the aqueous phase from the organic phase, heat the aqueous phase, recover an isomerised extract from the aqueous phase, contact the isomerised extract with sufficient acid to bring the pH to a value to 2 to 7 and sufficient 80 to 85% aqueous methanol to dissolve a part of the neutralised extract, separate the undissolved part and recover the dissolved part. It is desirable to add alkali to an extract so purified, in order to form a stable extract containing sodium isohumulates.

The impure isomerised extract is contacted with the 80 to 65% aqueous methanol and acid, preferably hydrochloric acid. The purification may be carried out by contacting the impure extract with just sufficient absolute methanol to dissolve the extract, and then adding hydrochloric acid, to bring the pH from 7 to 2. Finally additional water is added to bring the water content to from 15 to 20%.

The product may be centrifuged and the insoluble residue washed with 80 to 85% aqueous methanol. The washings may be added to the bulk of the solution and the methanol removed by distillation. It is preferred to add sufficient alkali to the product to bring the pH to a value of from 10 to 12 and preferably 10.5.

The processes described herein is of particular value for extracting cast dried hops; they may also be employed in extracting vine fresh or freeze dried hops.

The invention is illustrated by the following Examples relating to oasted hops:

EXAMPLE 1

100 lb. of a crude hop extract made by extracting hops with benzene in a solvent : hop ratio of 5 : 1 and a temperature of from 20° to 25°C. and removing the solvent from the extract, is run slowly into 50 gallons of 90% by volume aqueous methanol with continuous and vigorous mechanical agitation. Agitation is continued for 30 minutes after the completion of the addition. This stage of the process is carried out at a temperature of about 20°C. The mixture is then passed through a separating centrifuge. The heavy dark-coloured, oily residue is re-extracted with a further quantity of 10 gallons of 90% by volume nethanol once again with continued mechanical stirring for 15 minutes, and this material is also separated in a centrifuge. This re-extraction of the solid residue is repeated a sufficient number of times, usually three, to secure complete extraction of the active constituents, after which the solid residue is discarded. The original methanol extract is combined with the various wash liquors, the solvent removed by distillation, the last traces being removed under vacuum, and the residue of the desired, purified hop extract weighed 63 lbs.

EXAMPLE 2

The process described in Example 1 was repeated with a further 100 lbs. of hop extract except that 90% by volume aqueous ethanol was used in place of the 90% by volume methanol and the separation of the phases were effected by gravity on standing instead of using a centrifuge. The product was a purified hop extract very similar to that obtained by the process of Example 1, and weighed 72 lbs.

The solvent used in Example 1 and Example 2 can be replaced by 90% by volume aqueous industrial methylated spirit to obtain a purified hop extract of similar quality.

EXAMPLE 3

Hop concentrate, purified as descibed in Example 1 above, (100 lbs) was dissolved in benzene (30 gals). The resultant solution was agitated with a 10% weight by volume aqueous solution of potassium hydroxide sufficient to obtain a pH of 11.0 in the aqueous layer after separation. The volume of alkali solution required varies with the particular hop concentrate used, but in the Example, was of the order of 12.5 gals. After settling for several hours, the aqueous layer was run off and washed with benzene (5 gals). The original benzene solution was re-extracted with water (1 gal.), which was in turn run off and washed with the secondary benzene extract. The aqueous solutions were united and boiled at atmospheric pressure for one hour to remove dissolved solvent and to effect isomerisation.

The solution was then concentrated under reduced pressure to give 100 lbs. of a viscous extract containing 20% water further drying of this yielded 80 lbs of a dried product which could be powdered.

EXAMPLE 4

100 lbs of a crude hop extract made by extracting hops with light petroleum (boiling point 75° to 95°C). In a solvent : hop ratio of 5 : 1 at a temperature of from 20° to 25°C and removing the solvent from the extract, is run slowly into 50 gals of 95% by volume aqueous methanol with continuous and vigorous mechanical agitation. Agitation is continued for 30 minutes after the completion of the addition. This stage of the process is carried out at a temperature of about 20°C.

The mixture is then passed through a separating centrifuge. The heavy-coloured, oily residue is re-extracted with a further quantity of 10 gals of 95% by volume aqueous methanol, once again with continued agitation for 15 minutes, and this material is also separated in the centrifuge. This re-extraction of the solid residue is repeated a sufficient number of times, usually three, to secure complete extraction of the active constituent, after which the solid residue is discarded. The original methanol extract is combined with the various wash liquors, the solvent removed by distillation, the last traces being removed under vacuum, and the residue of the desired, purified hop extract is weighed and produces a yield of 68 lbs of product.

EXAMPLE 5

100 lbs of a crude hop extract made by extracting hops with benzene, in a solvent : hop ratio of 5 : 1 and a temperature of from 20° to 25°C was agitated with a 10% weight by volume aqueous solution of potassium hydroxide sufficient to obtain a pH of 11.0 in the aqueous layer after separation. The volume of alkali solution required varies with the particular hop concentrate used, but in the Example, was of the order 12.5 gals. After settling for several hours, the aqueous layer was run off and washed with benzene (5 gals). The original benzene solution was re-extracted with water (1 gal), which was in turn run off and washed with the secondary benzene extract. The aqueous solutions were united and boiled at atmospheric pressure for one hour to remove dissolved solvent and to effect isomerisation. The solution was then concentrated under reduced pressure to give 100 lbs of a viscous extract. The resultant isomerised viscous extract (moisture content 16%), which weighed 60 lbs., was dissolved in 20 gals of pure methanol, 2½ of 4N, aqueous hydrochloric acid and 1½ gals of water were added with stirring, so that the overall content of methanol in the solvent mixture was 80% volume by volume, i.e., it contained a total of 1.5 gallons of water. The mixture was centrifuged and the clear supernatent liquid (pH 3.2) separated. The residue was washed with three successive portions, each of 2½ gals, of 80% by volume methanol, i.e., containing a total of 1.5 gallons of water separating by centrifuging each time. The united methanolic extracts which therefore contained 6.5 gallons of water were distilled to remove the methanol, cooled, and 5 gals. of 2N aqueous potassium hydroxide was added to give a total water amount of 11.5 gallons. Evaporation of the solution yielded 50 lbs of dry solid that could readily be powdered therefore the aqueous solution after addition of the potassium hydroxide contained 50 lbs. of resin in 11.5 gallons of water representing a resin concentration of 30.3 % by weight and a water content of 69.7% by weight to the nearest decimal figure allowing for the limits of accuracy normally encountered in operation on this scale.

EXAMPLE 6

The procedure was as in Example 5, except that the unpurified isomerised extract was dissolved in 20 gals. of pure methanol, 3 gals of 4N aqueous hydrochloric acid and 2 gals distilled water were then added successively. The pH of this mixture was 2.0, and the final volume of 2N aqueous potassium hydroxide used was 6 gallons, the solution thus contained 2 gallons more water than the corresponding solution in Example 5. The yield of purified isomerised product was 51 lbs., the solution therefore contained 51 lbs. of extract in 13.5 gallons of water. This represents 72% of water by weight to the nearest significant figure.

The foregoing exemplifies the stable aqueous hop extracts of the present invention which contain substantially no fixed hop seed oil, and contain between 16% and 72% by weight of water together with the potassium isohumulate which is the active agent for bittering beer.

We claim:

1. A stable aqueous hop extract suitable for bittering beer, the said aqueous hop extract consisting essentially of potassium isohumulate and between 16% and 72% by weight of water and being substantially free from fixed hop seed oil.

2. The stable hop extract of claim 1 suitable for bittering beer containing substantially no fixed hop seed oil comprising 16% by weight of water and the remainder being hop extract consisting essentially of potassium isohumulate.

3. The stable hop extract of claim 1 suitable for bittering beer containing substantially no fixed hop seed oil comprising about 69.7% by weight of water and the remainder being hop extract consisting essentially of potassium isohumulate.

4. The stable hop extract of claim 1 suitable for bittering beer containing substantially no fixed hop seed oil comprising about 72% by weight of water and the remainder being hop extract consisting essentially of potassium isohumulate.

5. A method for bittering beer comprising adding to unhopped or lightly hopped beer a hop extract, which is readily dispersable in said beer, said hop extract consisting essentially of an aqueous solution of potassium isohumulate, said hop extract containing between 16% and 72% by weight of water and being substantially free from fixed hop seed oil.

6. The method of claim 5 wherein said hop extract is a viscous hop extract comprising 20% by weight of water and the remainder being hop extract consisting essentially of potassium isohumulate.

7. The method of claim 5 wherein said hop extract is a viscous hop extract comprising 16% by weight of water and the remainder being hop extract consisting essentially of potassium isohumulate.

8. The method of claim 5 wherein said hop extract comprises about 69.7% by weight of water, the remainder being hop extract consisting essentially of potassium isohumulate.

9. The method of claim 5 wherein said hop extract comprises about 72% by weight of water, the remainder being hop extract consisting essentially of potassium isohumulate.

* * * * *